(12) United States Patent
Weston et al.

(10) Patent No.: US 8,515,205 B2
(45) Date of Patent: Aug. 20, 2013

(54) PROCESSING OF IMAGES TO REPRESENT A TRANSITION IN VIEWPOINT

(75) Inventors: Martin Weston, Petersfield (GB); James Pearson, Hammersmith (GB)

(73) Assignee: Snell Limited, Reading (GB)

( * ) Notice: Subject to any disclaimer, the term of this patent is extended or adjusted under 35 U.S.C. 154(b) by 306 days.

(21) Appl. No.: 13/055,509

(22) PCT Filed: Jul. 23, 2009

(86) PCT No.: PCT/GB2009/050913
§ 371 (c)(1),
(2), (4) Date: Jun. 9, 2011

(87) PCT Pub. No.: WO2010/010401
PCT Pub. Date: Jan. 28, 2010

(65) Prior Publication Data
US 2011/0229054 A1 Sep. 22, 2011

(30) Foreign Application Priority Data
Jul. 23, 2008 (GB) .................................. 0813458.7

(51) Int. Cl.
*G06K 9/36* (2006.01)
(52) U.S. Cl.
USPC ........... 382/276; 382/284; 382/294; 382/300; 358/525; 358/540; 358/450
(58) Field of Classification Search
USPC ................. 382/284, 291, 294, 300; 358/525; 358/540, 450
See application file for complete search history.

(56) References Cited

U.S. PATENT DOCUMENTS

| 7,242,734 | B2  |    7/2007 | Skierszkan et al.          |
|-----------|-----|-----------|----------------------------|
| 7,280,696 | B2* |   10/2007 | Zakrzewski et al. ..........382/218 |
| 7,505,604 | B2* |    3/2009 | Zakrzewski et al. ..........382/100 |
| 7,773,115 | B2* |    8/2010 | Estevez et al. ............348/208.13 |
| 7,973,827 | B2* |    7/2011 | Motomura et al. ........348/222.1 |
| 8,275,219 | B2* |    9/2012 | Kameyama et al. ..........382/299 |

FOREIGN PATENT DOCUMENTS

| EP | 1482450    | 12/2004 |
| EP | 1785941 A1 | 5/2007  |
| EP | 1798691 A2 | 6/2007  |
| JP | 9062861    | 3/1997  |
| WO | 9504331    | 2/1995  |
| WO | 0213515    | 2/2002  |
| WO | 2005006773 | 1/2005  |

OTHER PUBLICATIONS

Graham Thomas, Real-time camera tracking using sports pitch markings, J Real-Time Image Proc (2007), Oct. 10, 2007, 117-132, (2 pages), Springer-Verlag.
PCT/GB2009/050913 International Search Report.
United Kingdom Intellectual Property Office Search Report for Application No. 0813458.7 dated Oct. 31, 2008 (4 pages).

* cited by examiner

*Primary Examiner* — Yosef Kassa
(74) *Attorney, Agent, or Firm* — Michael Best & Friedrich LLP

(57) ABSTRACT

When mixing cutting between video cameras viewing a common scene from different viewpoints, geometric transforms that vary from image to image are applied to one or both camera outputs so as to create an apparent point of view that moves along on a path joining the viewpoints of the cameras.

38 Claims, 9 Drawing Sheets

PROCESSING OF IMAGES TO REPRESENT A TRANSITION IN VIEWPOINT

CROSS-REFERENCE TO RELATED APPLICATIONS

This patent application is a national stage filing under 35 U.S.C. 371 of International Application No. PCT/GB2009/050913, filed Jul. 23, 2009, which claims foreign priority to Great Britain Patent Application No. 0813458.7, filed Jul. 23, 2008, the disclosures of which are incorporated by reference herein in their entireties. Priority to each application is hereby claimed.

FIELD OF INVENTION

This invention concerns the processing of image data to form a sequence of images representing an event or activity, such as a video editing or live production process.

BACKGROUND OF THE INVENTION

There are a number of conventional practices in the field of film and video editing which have evolved over time to assist the viewer of a video or audiovisual presentation in understanding the activity portrayed from the limited viewpoints of a finite number of camera positions. One such convention, that is particularly applicable to football or similar games where the progress of the action in a particular direction indicates an advantage to a particular team or participant, is that the direction of movement of the action should be portrayed consistently. It is thus common practice for all the cameras contributing to the broadcast of a football match to be situated on the same side of the pitch so that the viewer can instinctively associate horizontal movement towards a particular side of the image with an advantage to a particular team.

This conventional limitation can deny the viewer some information which would otherwise aid the understanding of the game, for example because some important action is masked by players situated between the camera and some particular critical action. Thus situations arise where defying the convention provides more information for the viewer, and therefore a view from an 'unexpected' direction is used. In such cases it is usual practice to add a caption, or audio commentary, to the relevant image so that the viewer can relate the new direction of view to previous views. This need for an additional caption or commentary is an inconvenient limitation.

One simple way of intuitively conveying to the viewer the fact that the viewpoint has been changed, and thus avoiding the need for an additional caption or commentary, is for the camera to move physically from one viewpoint to another while its output is presented to the viewer. This immediately emphasises that the viewpoint has changed and helps to convey the spatial relationship between the previous and current views of the scene. This procedure is usually impractical, except in the case of hand-held, portable cameras, and even then the time to move the camera will often be excessive, and the camera may not be able to be moved in a smooth and visually pleasing manner.

SUMMARY OF THE INVENTION

The inventor has appreciated that it is possible to process the image data from two cameras providing different views of a scene, so as to synthesise an image in which the view of the scene changes from the view provided by a first camera to the view provided by a second camera, in a way that gives the viewer the impression that the first camera moves its position, and changes its orientation, to the position and orientation of the second camera.

The invention consists in a method and apparatus for making an output sequence of images representing a transition between two input images or image sequences where the two input images or sequences of images include views of a common scene from different viewpoints wherein respective, geometric transforms that vary over the said output sequence are applied to both input images or sequences of images so as to create respective transformed images or image sequences having an apparent point of view that moves along on a path joining the viewpoints of the two input images or sequences of images and both transformed images or sequences of images are included in the said output sequence of images.

Suitably, the said geometric transforms smoothly interpolate the apparent fields of view of the transformed images between the respective input image or image sequence fields of view.

Advantageously, the said geometric transform is a perspective transform that dynamically transforms the shape of a notional laminar object lying in a plane in the said common scene so that it maintains the shape it would appear to have from the said apparent point of view.

In certain embodiments the height of the said path is chosen so that the height smoothly varies between the respective heights of the input image or image sequence viewpoints.

Preferably, the said path is chosen so that the distance between: points on the said path and, respective points on the said plane corresponding to the centres of the transformed images having an apparent point of view from that point on the path, smoothly varies between the respective distances corresponding to the two ends of the said path.

In some embodiments the path is chosen so that the horizontal angle of the line joining the said apparent point of view to a point in the scene corresponding to a chosen position in the transformed image smoothly varies between the respective angles corresponding to the ends of the said path.

Advantageously, the path is derived automatically from data associated with the said input images or image sequences.

In certain embodiments the said geometric transform varies the magnification of a transformed image in dependence on the distance between the said apparent point of view and a point in the scene corresponding to a chosen position in the said transformed image.

In a preferred embodiment the said output sequence is formed by crossfading between the respective said transformed images or image sequences.

In an alternative embodiment the said output sequence is formed by non additively mixing between the respective said transformed images or image sequences.

In a further alternative embodiment the said output sequence is formed by wiping between the respective said transformed images or image sequences.

In a yet further embodiment the said output sequence is formed by making a cut between the respective said transformed images or image sequences at a point on the said path.

BRIEF DESCRIPTION OF THE DRAWINGS

An example of the invention will now be described with reference to the drawings in which.

DETAILED DESCRIPTION OF THE INVENTION

Suppose that the director of a live television broadcast of a football match has pictures from a number of cameras available as inputs to a video mixer (sometimes known as a production switcher). He wishes to make a picture transition from the currently transmitted on-air picture, from a first camera, to the picture from a second camera that views the match from a direction that is unexpected to the viewer, but enables some important aspect of the game to be better appreciated. If he makes a cut to the second camera, the viewer will become disorientated and probably take a few seconds to relate the view provided the new picture to the view provided by the current picture. However, by making use of the invention he is able to: select the second camera from the set of available cameras; and, by moving a fader, cause the on-air picture to change from the first camera's picture to the second camera's picture in a way that gives the viewer the impression that the first camera has moved, under the control of the fader, to the position of the second camera, and simultaneously altered its field of view to that of the second camera.

Figure 1:
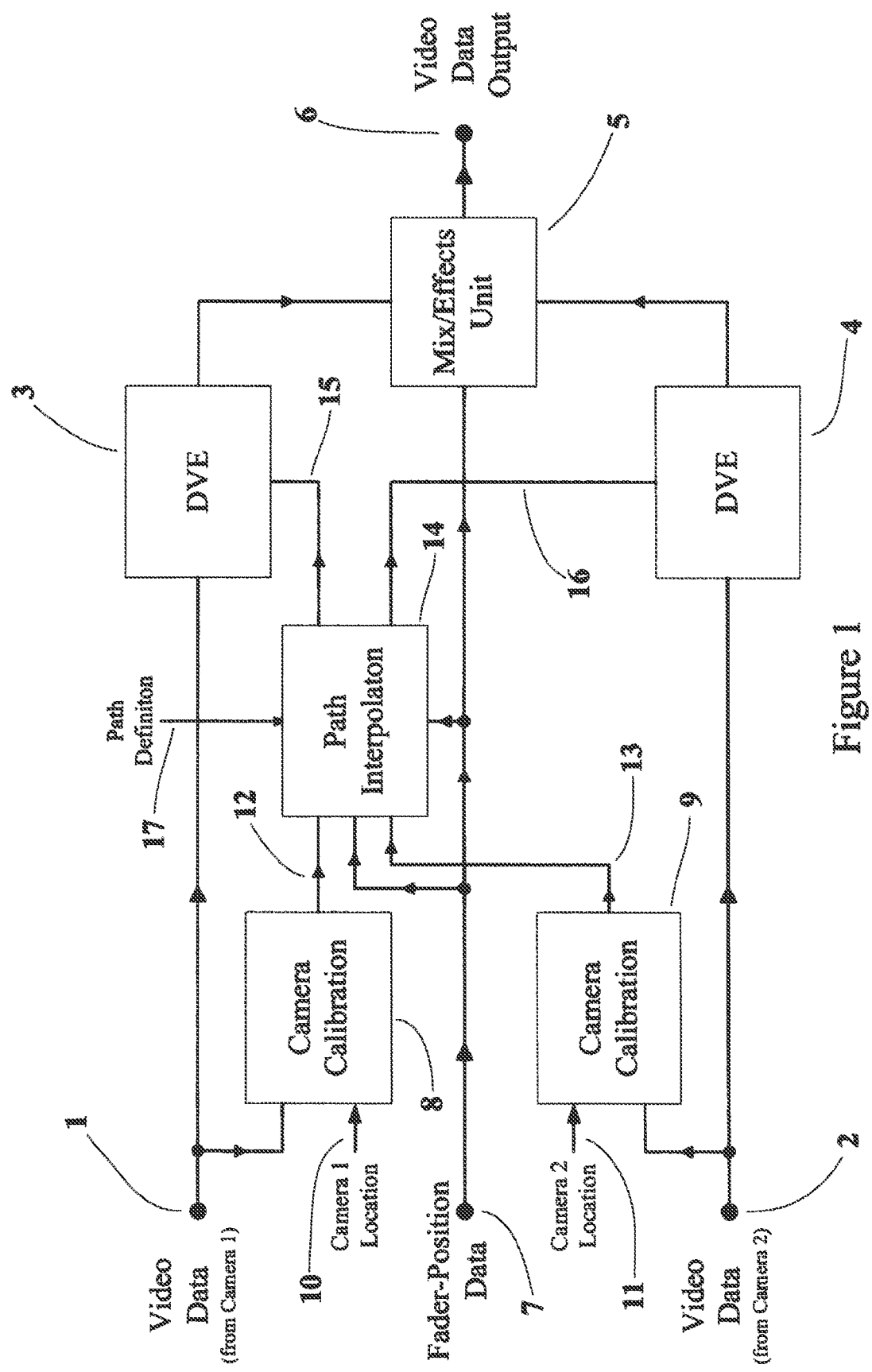
FIG. 1 shows a block diagram of a video processing system according to a particular embodiment of the invention.

A system that enables such a picture transition to be made is shown in FIG. 1. Referring to the Figure, video data (1) from the first camera and video data (2) from the second camera are fed, via respective digital video effects (DVE) processors (3) and (4), to a mix/effects (M/E) unit (5), which can combine, or perform transitions between, its video inputs and deliver the resulting video data at a video data output (6). The M/E unit (5) also receives 'fader-position' input data (7) that causes the M/E unit (5) to perform a transition. For example, when the input (7) has the value zero, the output data (6) corresponds to the video data (1) from the first camera; and, when the input (7) has the value unity, the output data (6) corresponds to the video data (2) from the second camera. Fractional values of the input (7) cause the M/E unit (5) to form a mix between the two camera pictures, where the proportions of the mix depend on the value of the input (7). Typically the video data inputs (1) and (2) are derived from video crosspoint switches, and the M/E unit (5) is capable of wipe and key effects as well as cuts and mixes. This arrangement is well-known and is found in many known video mixers; it will not be described in detail as it will be familiar to the skilled person.

The video data inputs (1) and (2) are fed to respective 'camera calibration' processes (8) and (9), which also receive respective 'camera location data' inputs (10) and (11) that describe the locations of the respective cameras. The camera calibration processes (8) and (9) derive, for each camera, respective data sets (12) and (13) that describe the camera position, camera orientation and field of view corresponding to every video frame. This data will be termed 'viewpoint data' and its content will be described more fully below.

The viewpoint data (12) corresponding to the first camera, and the viewpoint data (13) corresponding to the second camera, are input to a 'path interpolation' process (14), that also receives the fader-position data (7). The path interpolation process (14) has two outputs of DVE control data: DVE control data (15) that is input to the DVE (3) that processes video data (1) from the first camera; and, DVE control data (16) that is input to the DVE (4) that processes video data (2) from the second camera. (These processes will be described in detail below.)

Prior to the execution of the video transition the fader-position data (7) has the value zero. This zero-value data causes the M/E unit (5) to pass the output of DVE (3) (which processes the video data (1) from the first camera) to the video data output (6).

The zero-value fader-position data (7) also causes the path interpolation process (14) to set the DVE control data (15) to a null value that causes the DVE (3) to pass the video data (1) to the M/E unit (5) without modification. However, the DVE control data (16) is set to a state that causes the DVE (4) to transform the video data (2) so that it has the appearance it would have from the position, orientation and field of view of the first camera. This process will be explained in detail below.

As the fader is moved to initiate the picture transition, the fader-position data (7) increases to a small value. This causes the M/E unit (5) to output a mix comprising a high contribution from the output of DVE (3) and a low contribution from the output of DVE (4). Simultaneously the path interpolation process (14) changes the DVE control data (15) so that the DVE (3) transforms the video data (1) so that it has the appearance it would have from a position, close the first camera, on a path between the first and second cameras. And, path interpolation process (14) changes the DVE control data (16) so that the DVE (4) transforms the video data (2) so that it has the appearance it would have from that same position on the path between the two cameras.

As the fader is moved further to continue the transition, the M/E (5) increases the fraction of the video data output (6) that comes from the second camera (via DVE (4)), and decreases the fraction of the video data output (6) that comes from the first camera (via DVE (3)). And, the path interpolation process (14) changes the DVE control data (15) and (16) to transform the video data (1) and the video data (2) to the respective appearances they would have from a position on the path between the two cameras that moves closer to the position of the second camera.

Near the end of the transition the M/E (5) outputs a high contribution from the output of DVE (4) and a low contribution from the output of DVE (3). And, path interpolation process (14) outputs control data (15) and (16) that causes the DVE's (3) and (4) to transform the viewpoints of the video data (1) and (2) to a position close to the second camera.

Finally, at the end of the transition, the fader position data (7) reaches a value of unity, the M/E (5) delivers to the output (6) only video from the DVE (4), whose control data (16) has a null value that causes no modification of the video (2) by the DVE (4).

The viewpoint data (12) and (13) define the following parameters for every video frame:
  The location of the optical centre of the camera
  The direction in which the camera is pointing
  The field of view of the camera The optical centre location can be represented by three Cartesian co-ordinates relative to some datum point. The direction can be expressed as the elements of a unit vector defined with the same co-ordinate system as used to represent the location. The field of view depends on the frame size and shape of the camera's optical transducer and the focal length of the lens. Typically a zoom lens will be used and its focal length will vary with time under the control of a camera operator. This variation provides a variable magnification of the image. In the general case, it is also necessary to define the rotation angle of the optical transducer's frame about the direction of view axis; however this is usually intended to be held constant—i.e. the horizon is always horizontal in the intended picture.

There are known techniques for deriving this data. For example, after defining the camera location by conventional surveying methods, the field of view can be derived from shaft encoders in the camera pan and tilt mountings and the zoom lens control system, together with knowledge of the size and shape of the optical transducer's frame. Another method is described in a paper by Graham Thomas which describes how video data from images of a sports pitch can be processed in real-time to obtain 'camera calibration' data. The paper is entitled "Real-time camera tracking using sports pitch markings" and is published in:

Real-Time Image Proc (2007) 2:117-132 (DOI 10.1007/s11554007-0041-1).

In general, when a camera is moved, the positions on its optical transducer that correspond to objects in front of the lens will change: some objects, or parts of objects, may move outside the field of view; and, some objects or parts may become 'occluded' by other objects, so that light from them no longer reaches the transducer because the relevant ray is blocked by another object.

However, if the only object in the camera's field of view is a flat, two-dimensional (i.e. laminar) object lying in a plane in the scene, for example an empty football pitch without players, goal posts or surrounding buildings, the change in the image due to a change in camera position comprises only a perspective change; no new features are revealed, and all existing features remain in the image (apart from areas which move in or out of the camera's field of view). Changes in the relative positions of points on the plane that remain within the field of view correspond to a combination of translation, rotation shear and (non-isotropic) scaling. These changes may be represented mathematically as follows:

$$R=(ar+bu+c)\div(gr+hu+1)$$

$$U=(dr+eu+f)\div(gr+hu+1)$$

Where: R,U are Cartesian co-ordinates of the new position of a point in the image having original co-ordinates r,u; and, a to h are parameters that depend on the nature of the change.

The change is combination of an affine transform, represented the numerator; and, a 'foreshortening' term, represented by the divisor.

Image transformations of this type can be performed by the well-known techniques of DVE. These include manipulation of the read and or write addresses of pixel stores and interpolation and decimation of pixel values according to variable filter apertures.

It is thus possible for the DVEs (3) and (4) in FIG. 1 to transform the two different views of the, assumed flat, football field from the first and second cameras to the view from a third viewpoint that coincides with neither camera. The images from the two DVEs (3) (4) will show the pitch with the same size and shape and, when they are mixed in the ME (5), the two images of the pitch will be exactly superimposed in the output image (6).

Objects that are above or below the plane of the pitch will not be aligned in the two inputs to the ME (5) and will appear as 'double' images in the output image (6). However the viewer relies substantially on the pitch and its markings to appreciate the progress of the game and a change of viewpoint in which the pitch changes in a natural way will enable him to appreciate how the viewpoint has changed.

The two images of the parts of players, goal posts etc. that are above the plane of the pitch will only appear with equal amplitude half way through the transition. As the transition proceeds one image will fade in and the other will fade out, and the result is not disturbing.

In making a transition between the viewpoints of the two cameras corresponding to the video data (1) and (2), the 'virtual viewpoint' of the output picture (6) moves along some path between the positions of the two real cameras. There are an infinite number of such paths and the choice of path contributes to the visual acceptability of the transition. Generally the distance between the viewpoint and a point on the pitch at the centre of the picture should vary smoothly between the actual distances of the two real cameras from the respective points on the pitch at the centre of their respective pictures. Also, it is usually desirable for the height above the ground of the virtual viewpoint to change smoothly between the respective heights of the two real cameras.

The path interpolation processor (14) is provided with path definition data (17) that defines the path of the virtual camera as it moves between the positions of the two real cameras. The user may be given a choice of paths. These can be decided in advance from knowledge of the real camera positions, or inferred from the camera positions—for example by smoothly interpolating height and distance as described above.

The DVE control data (15) and (16) must define two perspective transformations that move the pixels of the respective image data (1) and (2) to new positions that depend on the position of the virtual camera that moves between the positions of the two real cameras. In order to explain how this data is generated it is necessary to explain the relationship between the pixels of a camera transducer and positions in its field of view.

A conventional camera forms a two-dimensional image of a scene by projecting the positions of objects in front of a lens onto corresponding positions on a planar imaging transducer located behind the lens. Usually the distance between the transducer and the lens is a little greater than the focal length of the lens, and light from points on objects which are not too close to the lens are focussed to corresponding points on the transducer. The range of object distances for which this happens is the depth of focus of the lens which is dependant on its diameter. Zoom lenses have adjustable focal length and means are provided to maintain the correct distance between the lens and the transducer as the focal length is changed. The centre of a camera's field of view is defined by a line drawn from the centre of the transducer through the centre of the lens. The extremities of the field of view are defined by the set of lines from all possible points on the edges of the transducer, each line passing through the centre of the lens.

Figure 2:
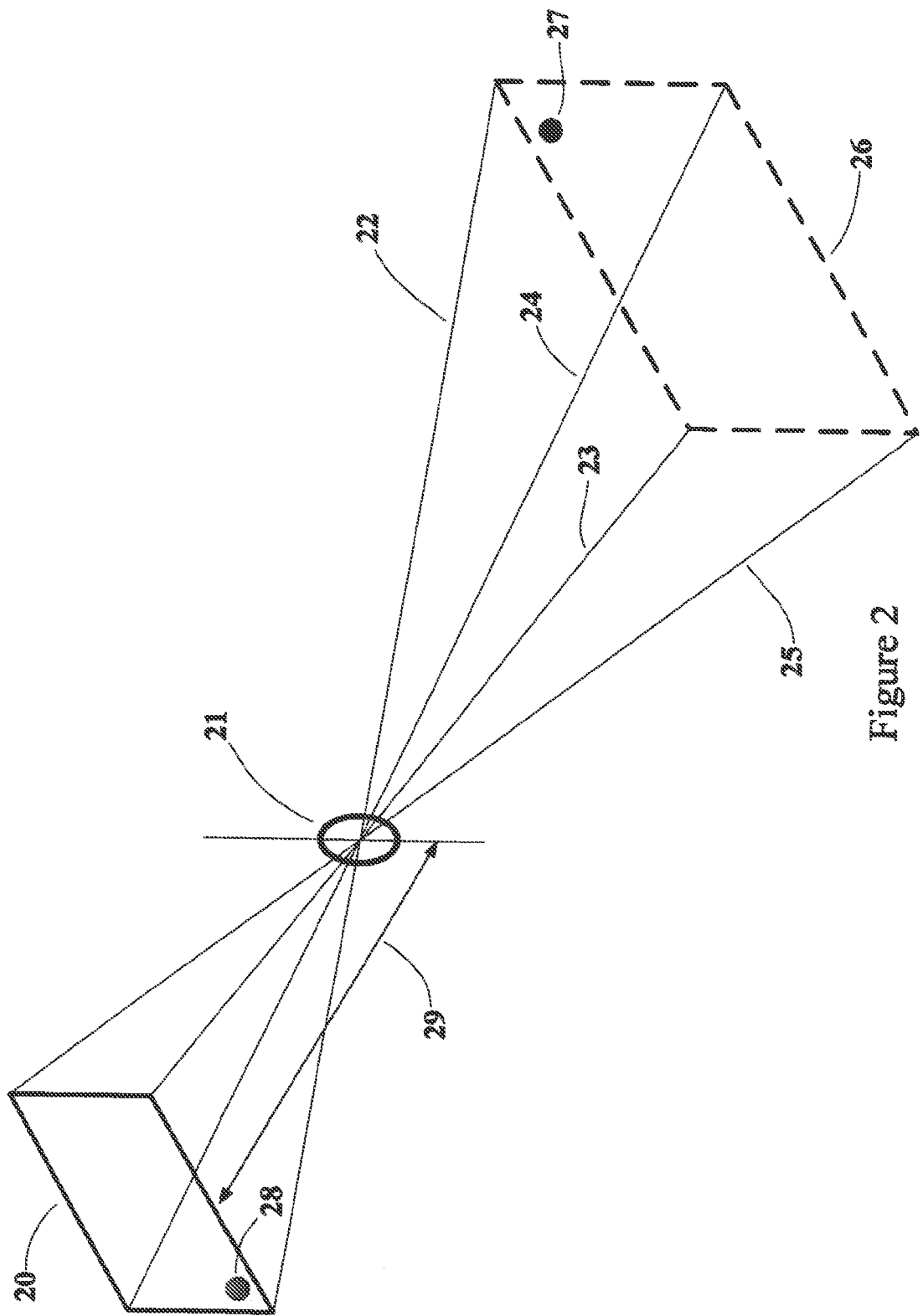
FIG. 2 shows a representation of the relationship between a pixel on the transducer of a camera and a corresponding object in the camera's field of view.

FIG. 2 shows the relationship between a rectangular camera transducer (20), such as a semiconductor sensor array, a lens (21) and four light rays that correspond to the top left (22), top right (23), bottom left (24) and bottom right (25) corners of the corresponding rectangular field of view. The Figure also shows a rectangular area (26) filling the field of view. An object (27), in the top left corner of the field of view, has a corresponding image position (28) on the transducer (20). Normally the distances between objects of interest and the camera are large as compared to the focal length of the lens; when the camera is focussed on such an object, the distance (29) between the transducer (20) and the lens (21) (measured in the direction perpendicular to the plane of the lens) is equal to the focal length of the lens. The term 'image distance' will be used to denote this distance in the remainder of this specification.

Figure 3:
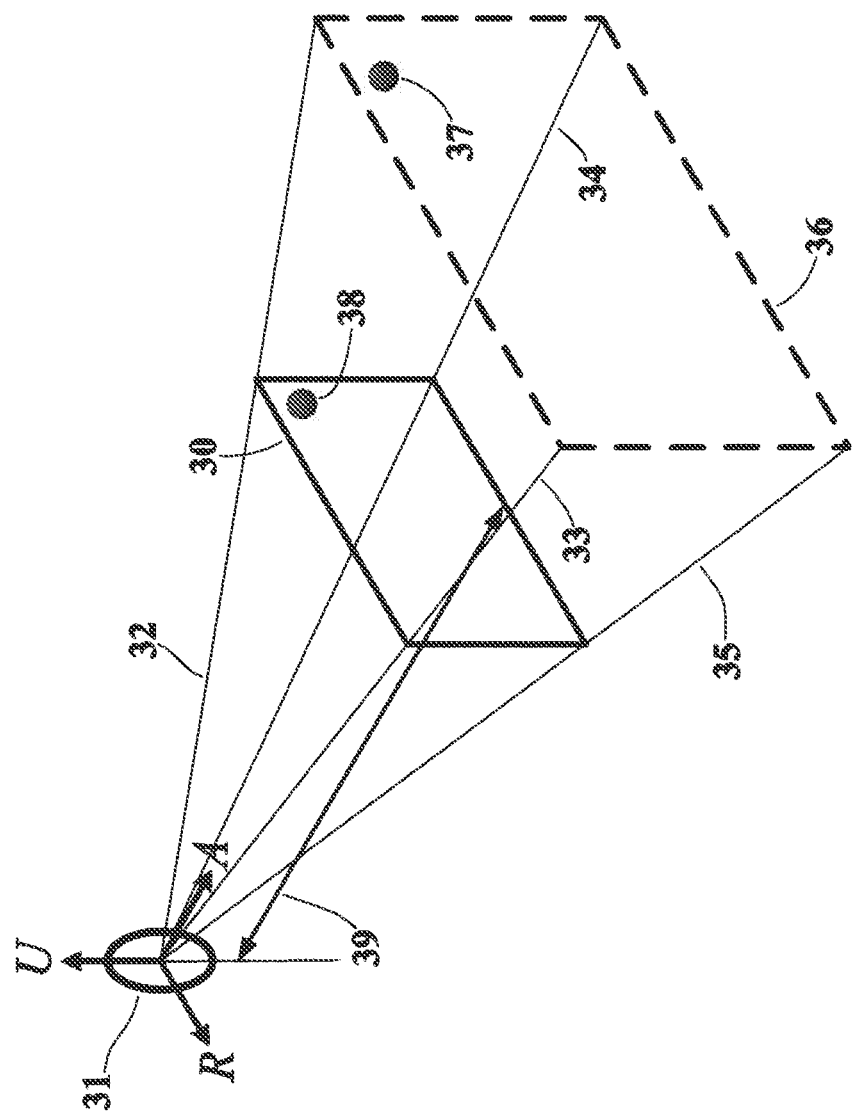
FIG. 3 shows an alternative representation of the relationship shown in FIG. 2.

The arrangement of FIG. 2 can also be represented as in FIG. 3, in which corresponding features have designatory numerals with the initial digit 3 replacing the initial 2 of FIG. 2. In FIG. 3 the camera transducer is shown in front of the lens rather than behind it; and the positions on the transducer of objects in the field of view can be determined by drawing the path of a light ray from the object to the centre of the lens and noting where the ray passes through the transducer (30). The distance (39) between the transducer (30) and the lens (31) is equal to the image distance. This representation will be used in the explanation which follows as it simplifies the geometry.

Pixel positions on the transducer (30) can be described according to a Cartesian co-ordinate system having its origin at the optical centre of the camera; i.e. the centre of the lens (31). A suitable system has co-ordinate axes R, U and A aligned as shown in FIG. 3 so that:
The R axis is parallel to the left to right direction of the transducer, directed to the right;
The U axis is parallel to the bottom to top direction of the transducer, directed up; and,
The A axis is perpendicular to the plane of the transducer, directed in the direction of view.

If, as is usually the case, the camera is focussed on distant objects, the A coordinate of all the pixel positions on the transducer (30) will be equal to the image distance (39).

The transducer pixel position (38) and the corresponding point in the field of view (37) can be expressed as vectors $P0_{R,U,A}$ and $P0'_{R,U,A}$ respectively. $P0'_{R,U,A}$ is a scaled version of $P0_{R,U,A}$; i.e. the two vectors have the same direction but the magnitude of $P0'_{R,U,A}$ is greater.

The perspective transformations that must be performed by the DVEs (3) and (4) of FIG. 1 must move pixels from positions on the transducer of a first camera to the positions of equivalent pixels of a second (virtual) camera, where the equivalent positions are determined by projecting pixels of the second camera onto a notional projection plane in the field of view of the second camera; and then projecting those positions on the projection plane onto the transducer of a first camera. The projections between the projection plane and the respective camera transducers must take into account the respective positions and fields of view of the cameras relative to the plane; i.e. 'calibration data' for the cameras.

Figure 4:
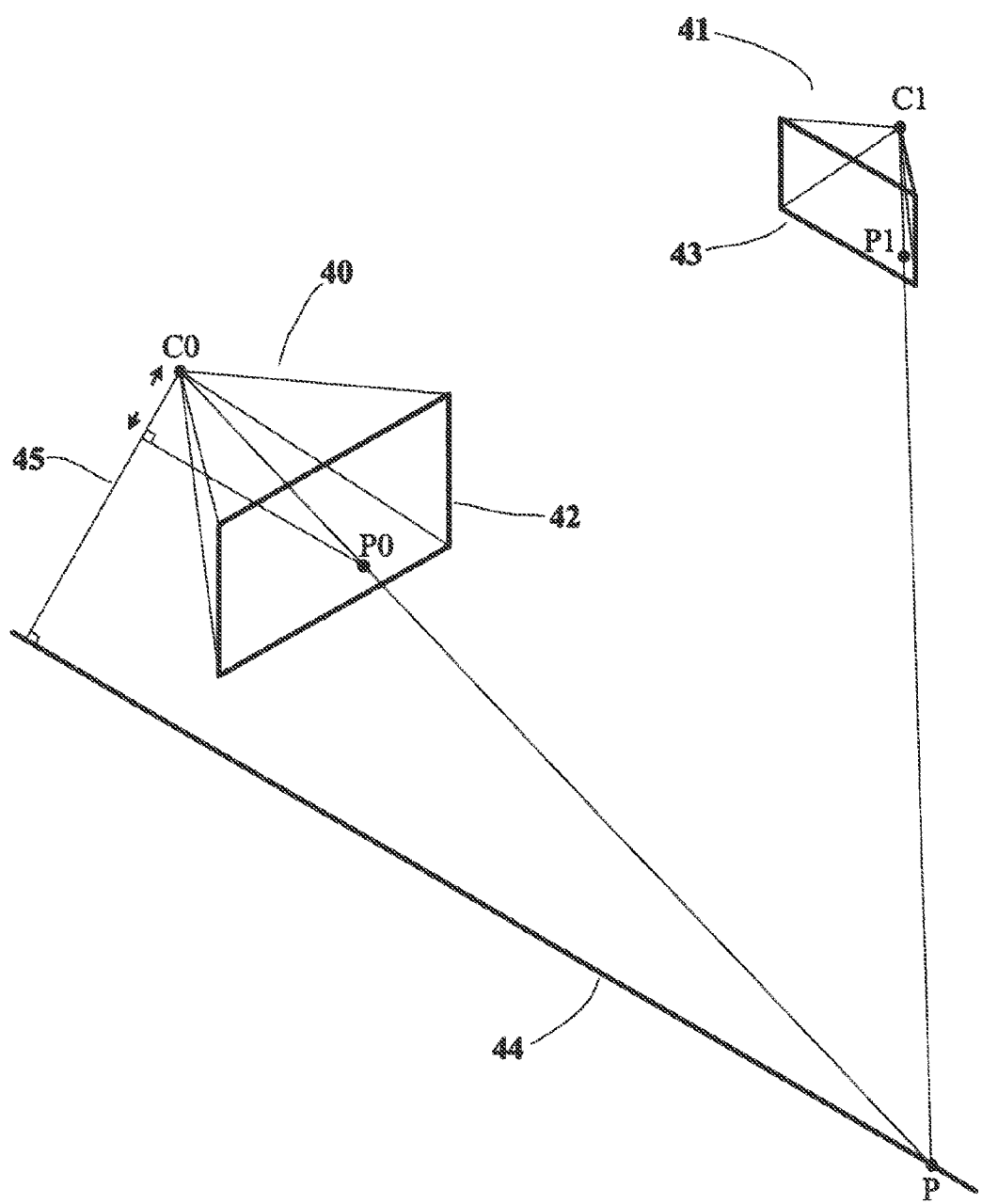
FIG. 4 shows a representation of two cameras having overlapping fields of view that include a point on a chosen plane of projection.

An example of such a perspective transformation is shown in FIG. 4. In the Figure two cameras (40) and (41) are represented in the manner of FIG. 3. They have respective optical centres C0 and C1 and transducers (42) and (43). A point P is within the field of view of both cameras and lies on the notional projection plane onto which the respective fields of view will be projected as described above. For convenience FIG. 4 is drawn from a viewpoint such that the plane appears as the line (44).

The point P corresponds to different pixel positions, P0 and P1 respectively, on the transducers (42) and (43). In order to perform the transformation it is necessary to find the relationship between these two pixel positions.

Let:
x, y, z be the axes of a 'world' co-ordinate system with its origin at a known reference point situated in the plane (44);
R0, U0, A0 be the axes of a local co-ordinate system with its origin at the optical centre of the camera (40), with the A0 axis aligned with its direction of view;
The directions of the axes R0, U0, A0 be defined by respective unit vectors having x, y, z components:
$R0_x, R0_y, R0_z$
$U0_x, U0_y, U0_z$
$A0_x, A0_y, A0_z$;
R1, U1, A1 be the axes of a local co-ordinate system with its origin at the optical centre of the camera (41), with the A1 axis aligned with its direction of view;
The directions of the axes R1, U1, A1 be defined by respective unit vectors having x, y, z components:
$R1_x, R1_y, R1_z$
$U1_x, U1_y, U1_z$
$A1_x, A1_y, A1_z$;
C0 be the optical centre of the camera (40) having co-ordinates $C0_x, C0_y, C0_z$, which may be expressed as the vector $C0_{x,y,z}$;
C1 be the optical centre of the camera (41) having co-ordinates $C1_x, C1_y, C1_z$, which may be expressed as the vector $C1_{x,y,z}$;
G be the plane of projection (44);
The unit vector normal to G have x, y, z components $G_x, G_y, G_z$
P be a point on G within the fields of view of the cameras (40) and (41) and having co-ordinates $P_x, P_y, P_z$, which may be expressed as the vector $P_{x,y,z}$;
P0 be the point on the transducer (42) of the camera (40) that corresponds to the point P;
$P0_{x,y,z} \equiv P0_{R0,U0,A0}$ be the vector from C0 to P0
$P0'_{x,y,z} \equiv P0'_{R0,U0,A0}$ be the vector from C0 to P
P1 be the point on the transducer (43) of the camera (41) that corresponds to the point P;
$P1_{x,y,z} \equiv P1_{R1,U1,A1}$ be the vector from C1 to P1
$P1'_{x,y,z} \equiv P1'_{R1,U1,A1}$ be the vector from C1 to P We need to find, for every pixel on the transducer (42) of the camera (40), the corresponding pixel on the transducer (43) such that both pixels correspond to the same point on the plane of projection (44). An example of such a process is summarized in the flow chart of FIG. 5.

In a first step (51) the first pixel on the transducer (42) of the camera (40) is selected. In step (52) the components of the corresponding vector from the optical centre to the selected pixel are determined: these define $P0_{R0,U0,A0}$. Typically pixel positions are identified in terms of line numbers, counted from the top of the sensor, and sample numbers, counted from the left edge of the sensor; these positions may be converted to R0, U0 co-ordinates from knowledge of the pixel size (i.e. sensor height and width divided by number of lines or samples respectively) and the position of the sampling grid relative to the centre of the sensor. As mentioned previously, the A0 component can be assumed to be equal to the image distance, which is known from the calibration data for the camera (40).

In step (53) the x, y, z components of the vector from the optical centre to the point P on the plane (44) are determined:

these define $P0'_{x,y,z}$. First $P0_{R0,U0,A0}$ is converted to x, y, z co-ordinates by rotation:

$$\begin{vmatrix} P0_x \\ P0_y \\ P0_z \end{vmatrix} = \begin{vmatrix} R0_x & U0_x & A0_x \\ R0_y & U0_y & A0_y \\ R0_z & U0_z & A0_z \end{vmatrix} \begin{vmatrix} P0_{R0} \\ P0_{U0} \\ P0_{A0} \end{vmatrix} \quad [1]$$

Note that, in this specification, the notation |M| is used to indicate a matrix; equation [1] is a matrix multiplication.

The wanted vector $P0'_{x,y,z}$ is a scaled version of $P0_{x,y,z}$. The scaling factor is the distance to P from the optical centre, divided by the distance to P0 from the optical centre. Referring to FIG. 4 we see that, if we draw the line (45) that is the shortest distance from C0 to the plane (44), the scaling factor is also equal (by similar triangles) to the shortest distance to C0 from the plane, divided by the distance to C0 from the projection of P0 onto the line (45).

The numerator of the scaling factor (i.e. the shortest distance to C0 from the plane) will be denoted $C0_d$ and is given by the scalar (dot) product:

$$C0_d = |G_x \quad G_y \quad G_z| \cdot \begin{vmatrix} C0_x \\ C0_y \\ C0_z \end{vmatrix} \quad [2]$$

The divisor is of the scaling factor is the distance $P0_d$ shown in FIG. 4. It is given by the scalar (dot) product:

$$P0_d = |G_x \quad G_y \quad G_z| \cdot \begin{vmatrix} P0_x \\ P0_y \\ P0_z \end{vmatrix} \quad [3]$$

The position of C0 is part of the camera calibration data, and $G_{x,y,z}$ is the direction of the chosen plane of projection. $P0'_{x,y,z}$ can then be calculated:

$$P'_{x,y,z} = P0_{x,y,z} \times (C0_d \div P0_d) \quad [4]$$

In step (54) the x, y, z co-ordinates of P are found by adding the components of the camera location C0 to the components of the vector $P0'_{x,y,z}$:

$$P_{x,y,z} = C0_{x,y,z} + P0'_{x,y,z} \quad [5]$$

In step (55) the vector $P1'_{x,y,z}$ from the optical centre C1 of the camera (41) to P is found by subtracting the co-ordinates of C1 from the co-ordinates of P:

$$P1'_{x,y,z} = P_{x,y,z} - C1_{x,y,z} \quad [6]$$

In step (56) the vector $P1'_{x,y,z}$ is converted to the vector $P1_{R1,U1,A1}$ by rotation of the co-ordinate axes and re-scaling. The rotation is given by:

$$\begin{vmatrix} P1'_{R1} \\ P1'_{U1} \\ P1'_{A1} \end{vmatrix} = \begin{vmatrix} R1_x & R1_y & R1_z \\ U1_x & U1_y & U1_z \\ A1_x & A1_y & A1_z \end{vmatrix} \begin{vmatrix} P1'_x \\ P1'_y \\ P1'_z \end{vmatrix} \quad [7]$$

The rescaling from $P1'_{R1,U1,A1}$ to $P1_{R1,U1,A1}$ can be achieved by making use of the fact that the A1 component of $P1_{R1,U1,A1}$ is equal to the image distance of the camera (41) which is known from the calibration data for that camera:

$$\begin{vmatrix} P1_{R1} \\ P1_{U1} \\ P1_{A1} \end{vmatrix} = \begin{vmatrix} P1'_{R1} \\ P1'_{U1} \\ P1'_{A1} \end{vmatrix} \times f1 \div P1'_{A1} \quad [8]$$

Where f1 is the image distance of the camera (41).

In step (57) the location of the pixel P1 on the transducer (43) of the camera (41) is converted to a line number and sample number. The co-ordinates $P1_{R1}$, $P1_{U1}$ (derived from equation 8) give the pixel location relative to the centre of the transducer (43). The known size of the pixels can be used to convert these coordinates to line number and sample number in a process that is the inverse of the process used in step (52).

In step (58) the pixel thus identified is associated with the first pixel of the transducer (42) and this relationship is stored and will be used to derive DVE control data.

In step (59) the next pixel of the transducer (42) is identified, and the steps (52) to (58) repeated so as to find the relationships between all the other pixels of the camera (40) and the respective pixels of the camera (41).

The relationships stored at step (58) can be used to control a DVE that processes the image data from the camera (41). For example the values of the pixels from the camera (41) can be stored in a frame store or file in which store addresses correspond to pixel locations (e.g. line and sample numbers). A transformed image, corresponding to the image from a 'virtual' camera, can be formed by reading the pixel values from the store according to the respective corresponding pixel locations as determined by the process of FIG. 5. As will be familiar to the skilled person, a transformed image may also be formed by a 'write-side' process in which input pixel values are written to a store according to transformed locations. Either processing method may involve known methods of sub-pixel interpolation to handle the non-integral correspondence of the respective transducer sampling structures.

There is no guarantee that all the pixels of the camera (40) will have equivalent positions on the transducer (43) of the camera (41). Where pixels correspond to positions on the plane of projection (44) that are not within the field of view of the camera (41) they will have no equivalent. This means that the transformed image from the DVE will typically have some blank areas. These can be set to some fixed value, or it may be possible to predict their values from nearby known pixels, or from a mathematical model of the scene, or key features of the scene such as buildings etc. A more comprehensive solution is described below.

Figure 5:
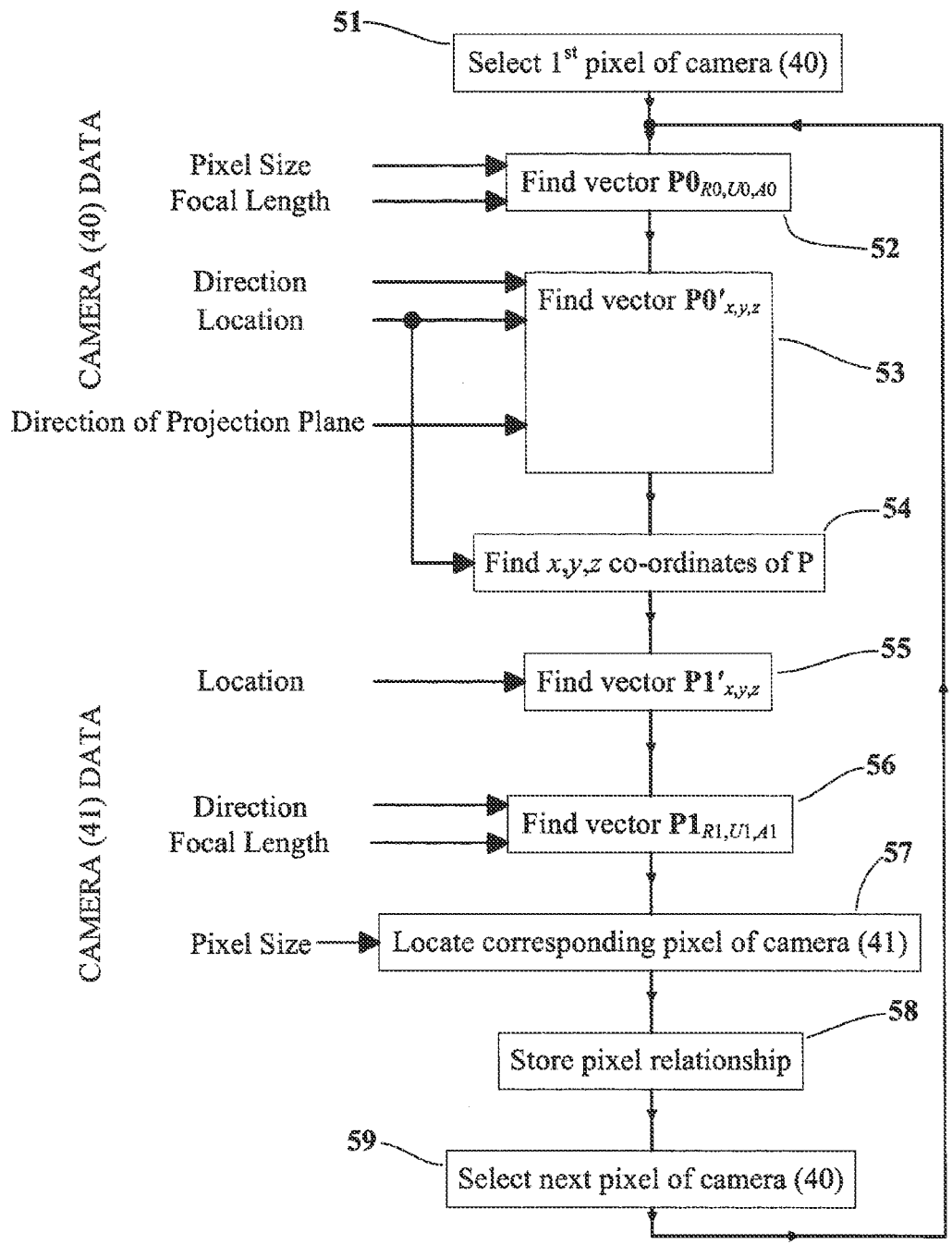
FIG. 5 shows the flow diagram of a process for determining the correspondence between pixels from two cameras.

The process of FIG. 5 can thus be used to create DVE control data (15) (16) that changes the input video data (1) and (2) so that it appears as it would from the position of a virtual camera having different location and field of view.

The path interpolation process (14) must determine, for every image of the output image sequence (6), the location of the virtual camera, its image distance and its direction of view. As mentioned previously, the location is a point on a previously selected path between the two cameras providing the input video data (1) and (2). The position on the path is obtained by multiplying the total length of the path by the fader position data (7). The image distance is obtained by interpolating between the image distances of the cameras providing the video data (1) and (2), according to the fader position data (7).

The direction of view of the virtual camera could also be interpolated between the directions of view of the two input cameras. However, a better result is obtained if the centre of the field of view of the virtual camera moves smoothly between the field of view centres for the respective input cameras. The centre of the field of view for a camera can be taken as the point on the projection plane (44) that corresponds to its central pixel, i.e. the pixel having both its U and A co-ordinates equal to zero. The respective points can be calculated for the two input cameras, and the orientation of the virtual camera varied so that its centre pixel moves smoothly along a straight line between these points as the transition proceeds. Other definitions of the field of view centre can be used, for example if the location of the ball or a key person is known in both input images, then the orientation of the virtual camera can be chosen to smoothly interpolate that location between its position in the two input camera images.

The change in zoom factor (due to the difference in image distance between the two input cameras) during the transition can be made more consistent with the change in virtual camera position if the ratio of the virtual camera's image distance to its distance from the centre of its field of view is smoothly interpolated between the values corresponding to the two input images.

It has been explained previously that the choice of path has a significant effect on the appearance of the transition, and that the path height and virtual camera distance from the scene should preferably change smoothly between the respective values for the two input cameras. It is thus possible to derive a preferred path automatically from the calibration data for the two input cameras.

Figure 6:
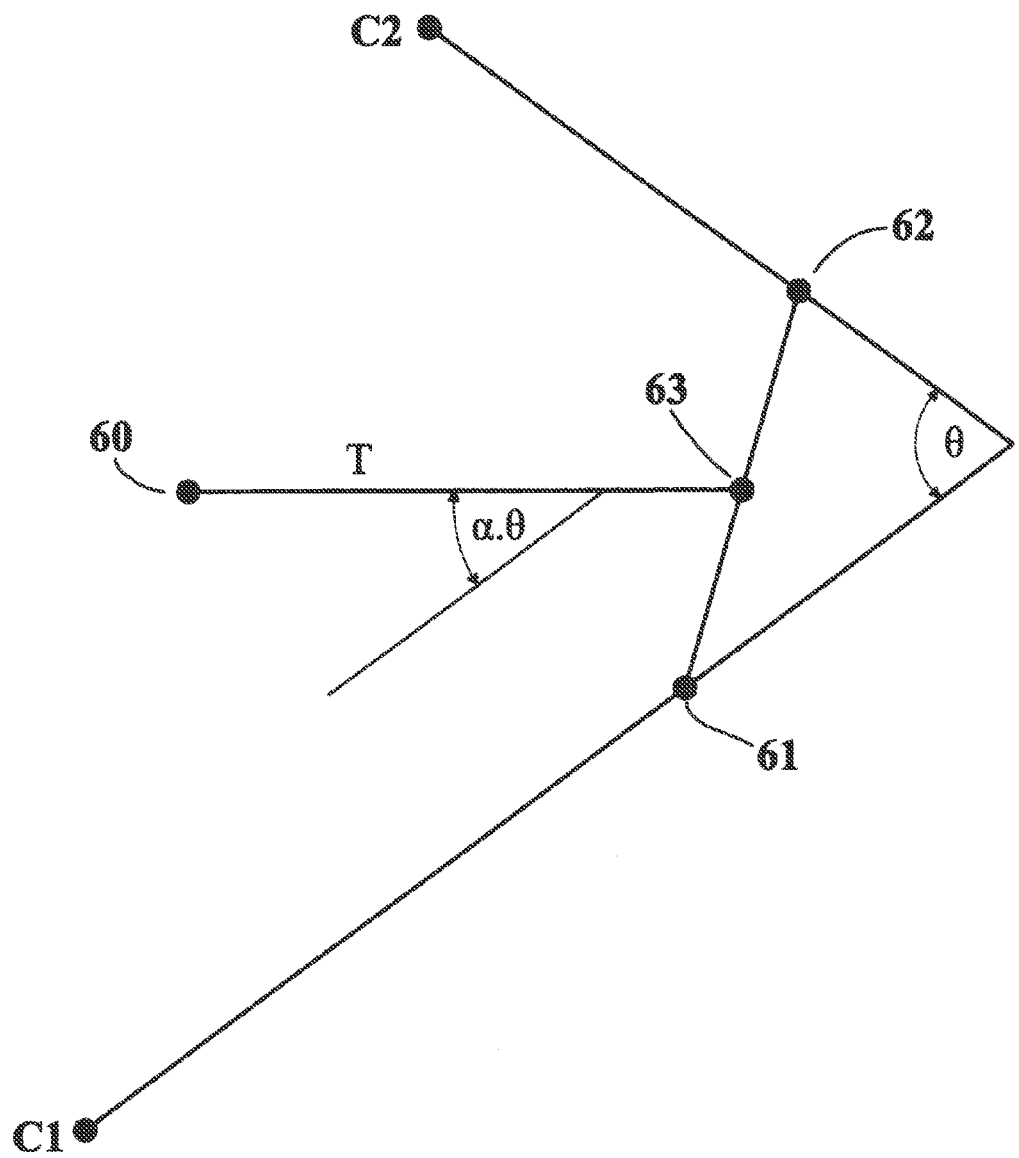
FIG. 6 shows a plan view of the positions of three cameras and the respective centres of their fields of view.

The height of this preferred path and its distance from the centre of the field of view are smoothly interpolated between the corresponding input camera positions. The horizontal angle between the input camera axes is also smoothly interpolated to determine the position and shape of the path. This is shown in FIG. 6, which is a plan view showing two input camera positions C1, C2 and a virtual camera position (60). The input cameras have respective field of view centres at the points (61) and (62). The centre of the virtual camera's field of view is at the point (63) on the line joining these input field of view centres.

The horizontal angle between the axes of the input cameras is $\theta$. The horizontal angle of the virtual camera's axis relative the axis of the camera C1 is $\alpha \cdot \theta$, where $\alpha$ is a parameter related to the fader position having the value zero at the start of the transition and the value unity at the end of the transition. The position (63) of the virtual camera's field of view also depends on $\alpha$. When $\alpha$ is zero the point (63) coincides with centre (61) of the camera C1's field of view; and, when $\alpha$ is unity the point (63) coincides with centre (62) of the camera C2's field of view.

It can be seen from the figure that, if the horizontal distance, designated T, between the virtual camera and the centre of its field of view (63) is known, the position (60) of the virtual camera can be determined from the positions of the input cameras and $\alpha$.

The horizontal distance T can be calculated, using Pythagoras' theorem, from the height of the virtual camera and the distance between the virtual camera and the centre of its field of view. Both of these are known because, as explained above, they are interpolated between the respective values for the two input cameras.

The location of the virtual camera can thus be determined at any point in the transition without the need for a prior determination of the path. The orientation of the virtual camera is always towards its interpolated image centre position and thus all the parameters for controlling the DVEs can be determined.

In the systems described so far a single plane of projection, typically corresponding to the playing area of a sporting event, has been used, and, as described previously, objects above or below this plane may behave unnaturally as the virtual camera changes its position. Often the scene contains fixed objects that approximate to planes and this unnatural behaviour can be reduced by projecting the pixels that represent these fixed objects onto different planes of projection that are more closely aligned with the respective portrayed objects.

For example the spectators at a football match typically occupy tiers of bleachers that correspond to inclined planes rising from the four sides of the pitch. By projecting pixels corresponding to the areas at the sides of the pitch onto these inclined planes that correspond to the positions of the spectators, a more realistic virtual camera image is obtained and, in some cases, a larger part of the virtual camera's field of view is filled. Another alternative is to define vertical planes aligned with the sides of the pitch and to project all pixels lying outside the pitch area onto the relevant vertical plane. When televising football it is also helpful to define a vertical plane that coincides with the goal, covering the 'goal mouth' and nearby goal features such as the posts and net.

Projection onto these additional planes is achieved by position-dependant modification of the DVE data (15) or (16). Every pixel in the virtual view is assessed to determine whether it lies on one of the additional planes. This is done making use of the viewpoint data for the virtual camera, and knowledge of the positions of the planes. As these positions are fixed in space, pixels can be allocated to planes according to their positions in the image and the viewpoint data for the virtual camera.

The problem of ensuring that the virtual camera's field of view is always filled can be solved by creating a 'reference' virtual image, having a viewpoint and field of view that includes all the objects that will be 'seen' by any of the cameras that will be used. The reference image is synthesised by combining information from all of the available real cameras, and a suitable method is described below. This 'reference' image can be used as if it were from another real camera and transformed to the viewpoint of the virtual camera undergoing a viewpoint transition. Because all relevant objects are included in the reference image, it can be used to 'fill-in' parts of the field of view of the virtual camera that do not contain pixels corresponding to a real camera involved in a transition.

A suitable viewpoint for a reference image to be used in a football match is above the centre of the pitch, with its field of view directed vertically downwards. The height above the pitch and the angle of view should be sufficient to include all those parts of the surroundings (spectators, stadium structure etc.) that are likely to be 'seen' during a transition by a virtual camera.

The reference image can be compiled from the outputs of the real cameras by transforming their outputs to the 'reference camera' position and storing the results. As a DVE process is required to transform the various camera images to the reference viewpoint, and the number of available DVE processors is usually limited, it is convenient to select the cameras individually in sequence when compiling the reference image and this is shown in FIG. 7.

Figure 7:
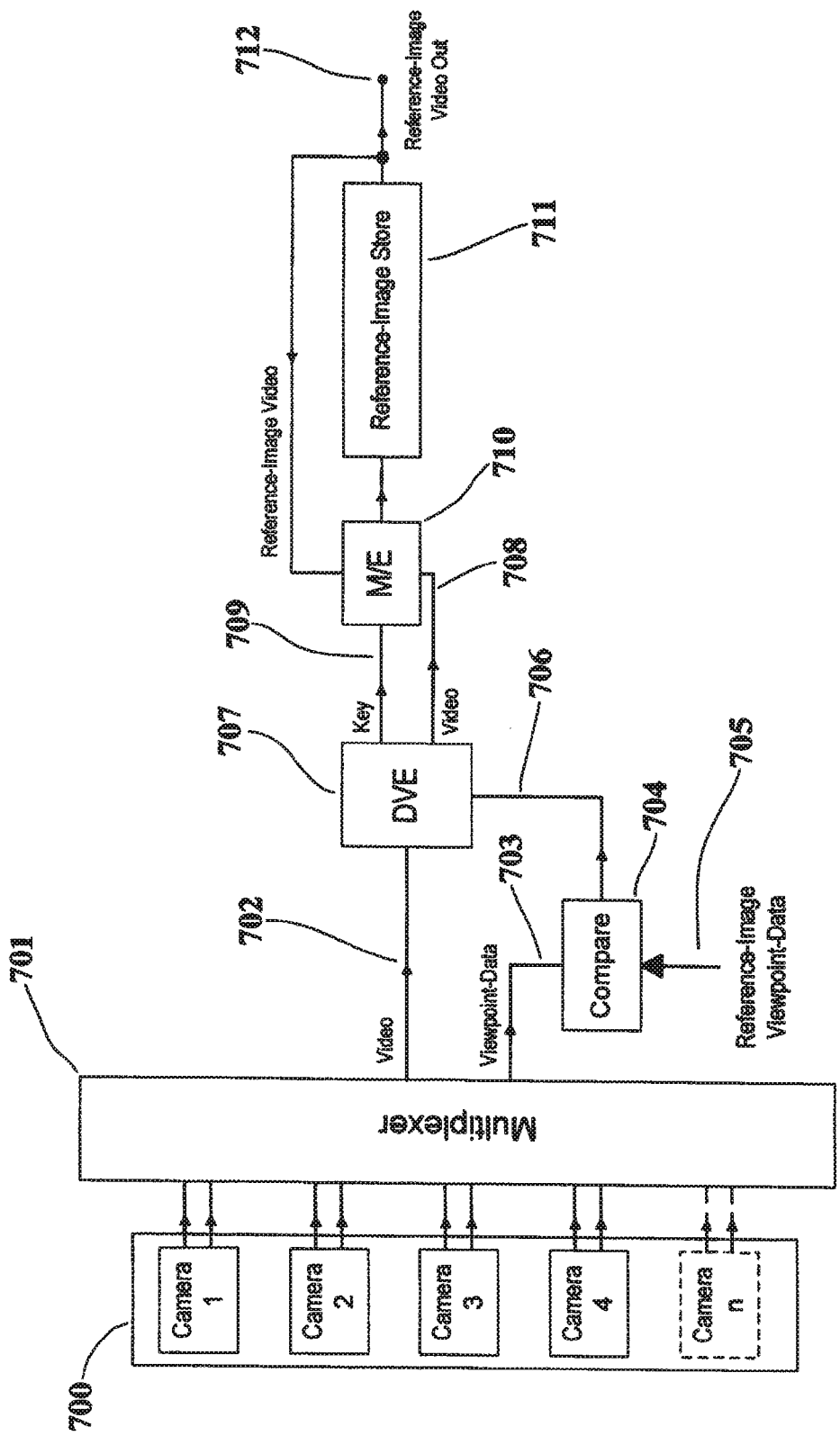
FIG. 7 shows a block diagram of a system for deriving a reference image for use with embodiments of the present invention.

Referring to FIG. 7, a set of input cameras (700) provide respective inputs to a multiplexer (701). Each of the cameras (700) gives a video output and a viewpoint-data output, and, at any one time, the multiplexer (701) selects the outputs corresponding to one of the cameras (700) to provide a selected video output (702) and a selected viewpoint-data output (703). Typically, the set of cameras (700) comprises all the available camera that can 'see' any part of the area of interest. The respective viewpoint-data from each camera defines its location and field of view as described previously, and, typically, many of the cameras will be controlled in some way, so that their respective fields of view will change over time.

The multiplexer (701) outputs video and the associated viewpoint-data from each of the cameras (700) in turn so that, over a period of time, a few seconds say, video and viewpoint-data from all of the cameras (700) will have been output at the video output (702) and the viewpoint-data output (703).

The viewpoint-data output (703) is input to a comparator (704), which compares it with reference-image viewpoint-data (705). This reference-image viewpoint-data defines the location and viewpoint of a virtual reference camera having a field of view including the entire scene. Typically the reference-image viewpoint-data (705) will be fixed and will correspond to a wide angle view from a point above the centre of the scene.

The comparator (704) calculates DVE control data (706) that describes the perspective transform that must be applied to the view defined by the viewpoint-data (703) in order to change the view to that defined by the reference-image viewpoint-data (705). The video output (702) from the multiplexer (701) is transformed, according to the DVE control data (706), in a DVE (707) to give partial reference image video (708). Because the video (702) does not represent a view from the virtual reference camera position, the partial reference image video (708) will not (in general) fill the whole frame. The DVE (707) also provides a partial reference image key signal (709) by applying the same perspective transform that is applied to the video output (702) to a blanking signal that describes the active image area of the video output (702).

The partial reference image video (708) is input to a M/E unit (710) that is controlled by the partial reference image key signal (709). When this key signal is active, the partial reference image video (708) is input to a reference-image store (711), which outputs a reference-image video signal (712). When the partial reference image key signal (709) is inactive, the M/E (710) routes the output reference-image video signal (712) to the input of the reference-image store (711).

At any one time, the reference-image video signal (712) comprises: live video from the camera currently selected by the multiplexer (701) in those parts of the reference image that correspond to the view from the selected camera; and, stored video in the remainder of the image area. Over a period time, all the available cameras will be selected, and their views will change during the time that they are selected, so that it is highly likely that a reference image covering the whole of the view from the virtual reference camera position will be built-up. Much of the image will be 'old' video data, but, because the reference image viewpoint is fixed, fixed objects will be correctly represented.

The availability of a reference image in which only fixed objects predominate enables the double-image problem referred to earlier to be avoided. And the combination of different views taken at different times in order to compile the reference picture can be advantageous, because fixed objects (pitch lines, goal posts etc.) will be reinforced and therefore predominate, whereas moving objects (players, balls etc.) will tend to disappear.

Other methods of forming the reference image from a combination of live and stored video information may be used. An alternative to the 'latest takes' precedence system described above is recursive combination, so that a moving average of contributions is used, possibly with higher contributions from more recent views.

The use of the reference image to 'augment' the content of a transformed image by filling in parts of the transformed view that are not visible to the source camera will now be described with reference to FIG. 8. This figure has many elements in common with FIG. 7, and these have been given common designatory numerals with the initial digit 7 replaced by 8.

Figure 8:
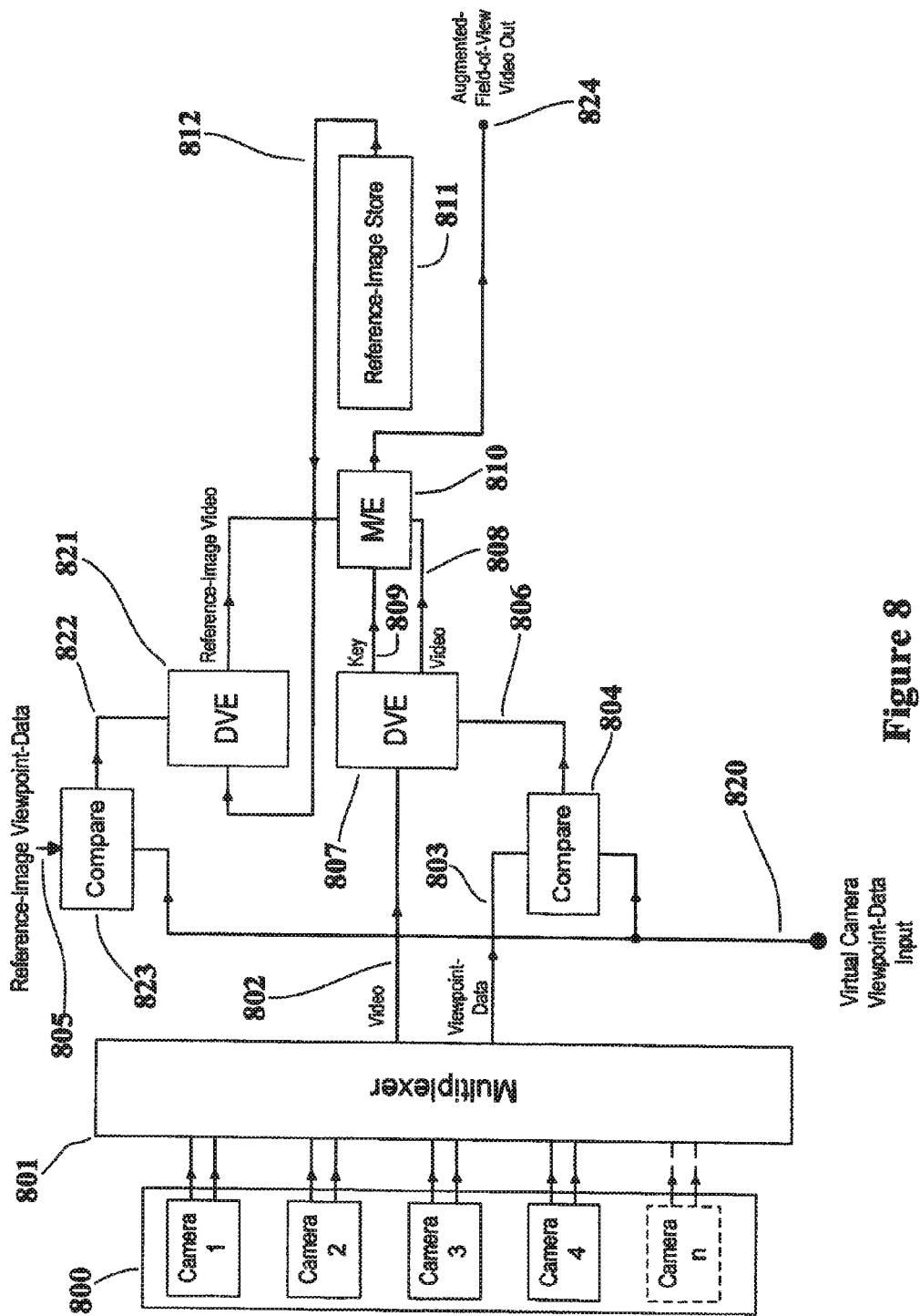
FIG. 8 shows a block diagram of a video processing system according to a particular embodiment of the invention.

Referring to FIG. 8, one of the cameras (800) is to be transformed to a virtual camera position (that typically will change its position and view during a transition) defined by virtual camera viewpoint-data (820). That camera's video and corresponding viewpoint data are selected by the multiplexer (801), and the video is transformed by a DVE (807) to provide partial-image video (808). These processes are exactly analogous to the creation of partial reference-image video described above. The partial-image video (808) may not fill its frame because some parts of the required virtual view may not be visible from the real camera position.

The missing image areas are replaced by video derived from the output of the reference image store (811), which has been previously loaded with a reference image according to the process illustrated in FIG. 7. The active area of the video (808) is defined by a key signal (809) that is produced in the DVE (807) by transforming the active area key signal for the video (802) identically as the video itself. An M/E unit (810) keys the video output from a second DVE (821) into the missing image areas, according to the key (809).

The second DVE (821) transforms the output of the reference-image store (811), which, of course, corresponds to the viewpoint of the virtual reference camera, so that it appears as it would appear from the position and view of the virtual camera, as defined by the virtual camera viewpoint data (820). DVE control data (822) to achieve this transformation is created by comparing the virtual camera viewpoint data (820) with reference-image viewpoint data (805) in a comparator (823). This process is exactly analogous with the derivation of the DVE control data (806) for the DVE (807).

Because the reference camera location and view are chosen so that the whole area of interest is included in the reference image, the transformed reference image output from the DVE (821) will always be a full frame with no missing areas, and thus the output (824) from the M/E (810) will also have no missing areas and can be used as a constituent part of a video transition, for example by forming an input to the M/E (5) in the system of FIG. 1.

As will be apparent from the foregoing description, the process of deriving a full frame image from a, potentially 'flying', virtual camera is very similar to, and shares much of the same processing resources as, the process of building the reference image. As the construction of the reference image is essentially a 'background task', updating of the contents of the reference image store can be suspended during the processing of a video transition, and the common resources allocated to the creation of a full-frame virtual camera image to form part of the transition.

The techniques described so far enable changes of spatial viewpoint to be made in a way that avoids disorientation of the viewer. However, another aspect of modern television presentation of sporting events is the use of 'action-replays' in which a recording of an event of interest is re-played, often in slower than real time. These replays also have the potential to disorientate the viewer, but temporally rather than spatially. As in the case of unexpected viewpoints, the replay of action that has already been presented is conventionally accompanied by a replay-indicator, such as a special logo, or a verbal explanation in the audio commentary. The methods of the invention can be extended in ways that avoid the need for this additional information.

The viewer can be made aware that he is about to see some action that took place at a time earlier than the immediately-portrayed action by playing the immediately-portrayed action backwards from the current time to the time start time of the action-replay. After the end of the replay, the action that would have been missed, i.e. what would have been shown had the replay not been shown, is shown at faster than real time until the 'current' time point is reached. This is shown diagrammatically in FIG. 9.

Figure 9:
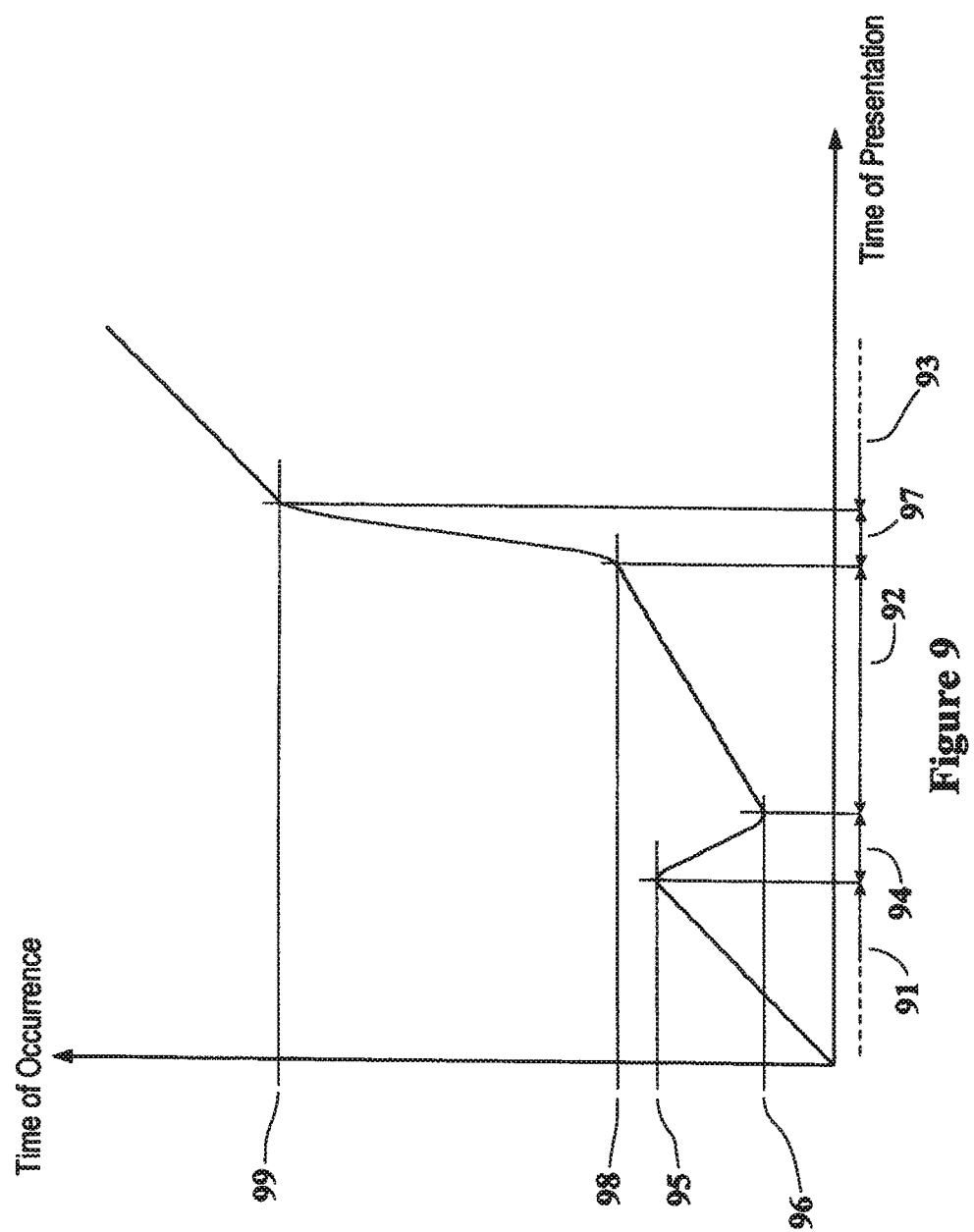
FIG. 9 is a time plot for use in understanding an optional feature of the present invention.

FIG. 9 shows a graph of the time at which portrayed events occurred, plotted against the time at which they are presented to the viewer. During an initial time period (91), events are portrayed as they occur, and the presentation time is equal to the time of occurrence. During a later time period (92) an action-replay is presented, and the time of presentation is earlier than the time of occurrence. During a still later time period (93), events are, again, presented to the viewer as they occur.

In order to avoid presenting the viewer with a disorientating 'temporal cut', during the time period (94) immediately prior to the presentation of the replay, the portrayed time is smoothly decreased from the 'current time' (95) to the time (96) at which the first frame of the action-replay was recorded. This is achieved by playing a recording of one of the cameras, preferably the camera presented to the viewer at time (95), backwards from current time to the required replay start time (96). The speed of this backward replay will typically be faster than real time, and, as shown in FIG. 9, need not be constant.

During a time period (97) immediately following the end of the presentation of the action-replay, the portrayed time is smoothly increased from the time (98) corresponding to the final frame of the action-replay, to the 'current time' (99). This is achieved by playing a recording of one of the cameras, at a speed faster than real time. The time (98) may be earlier or later than the time (95), depending on the length and speed of the action-replay; typically the action replay will be 'slow motion', and this case is illustrated in FIG. 8. In this way the viewer will have been presented with the entire temporal sequence of events, some action slower than real time and other action faster than real time.

These temporal transitions, i.e. 're-winding' to an earlier time during the period (94) and 'catching-up' with current time during the period (97), can be used independently or combined with the spatial transition techniques described above. Usually the action-replay sequence will start and end with viewpoints different from the preceding and succeeding material, and spatial viewpoint transitions can be chosen to occur wholly or partly simultaneously with the temporal 're-wind' and 'catch-up'.

For example, the viewpoint may 'fly' to a different camera whilst 're-winding' to the start of some critical action; the critical action may be replayed in slow motion as seen by that different camera; and then the viewpoint may 'fly' to a third camera whilst 'catching-up' with current time.

The various techniques that have been described can be combined in many ways. A transition from one video source to another may comprise a set of intermediate transitions, which may involve the use of a 'reference image'. Each of the intermediate transitions may have spatial, temporal and M/E features, and the relative timing of each of these three features may differ.

The spatial aspect is achieved by dynamically changing the viewpoint of one or more images contributing to the transition by means of perspective transformation in a DVE process. As mentioned previously different parts of a contributing image, for example the pitch and the spectators at a football match, may have different transforms applied.

The temporal aspect is achieved by replaying recently-recorded video, either forwards or backwards faster than real time.

The M/E aspect is achieved by the well known processes of cutting, mixing, wiping, keying or non-additive (i.e. video dependant) mixing between video sources.

The range of transitions that can be performed will depend on the available processing resources, such the number of simultaneously available DVE processors, the availability of a reference image store, and the availability of clip storage and the range of M/E effects available. Some examples, at differing levels of complexity will now be described.

If only a single DVE is available:
  'Fly' from the current camera towards a new camera with a cut between the two video sources at a point along the 'flight'.
If a single DVE and a reference store are available:
  Fade from the current camera to the reference image (as seen from the current camera's viewpoint); then fly to the viewpoint of a new camera; and, then fade to the new camera.
If two DVEs are available:
  'Fly' from the current camera towards a new camera with a crossfade between the two camera as the 'flight' progresses. (Note that the frame will not always be filled).
If a two DVEs and a reference store are available:
  'Fly' from the current camera towards a new camera with a crossfade between the first cameras and the reference picture during an earlier part of the 'flight' and a crossfade from the reference picture to the second camera during a later part of the 'flight', whilst always filling the frame.
If three DVEs and a reference store are available:
  'Fly' from the current camera towards a new camera with a crossfade between the two cameras as the 'flight' progresses, whilst always filling the frame.
If a video clip-store is available in addition to any of the above configurations, and the second camera is replaced by an action replay source, the information from the first camera can re-wind to the time at the start of the replay whilst its video contributes to the transition.

Other transition types will be apparent to the skilled person from the novel principles that have been described herein.

The invention has been described by way of example and other embodiments exist. For example, the M/E unit (5) can perform different, known video transitions such as a cut, a wipe, or non-additive mix or keying effects where the contribution of input video data to the output video data depends on the pixel values of the input video data, or some other video data. As can be noted from the above examples, there is an advantage in making a cut in the M/E unit (5), as only one camera contributes to any one output image, and thus only a single DVE process is required.

The relationship between the fader position and the change of view may be different from the relationship between the fader position and the progress of the video transition performed by the M/E unit (5); and, neither relationship need be a linear function.

There is no need for a transition to be completed—it may be reversed fully or partially at any point; and, an intermediate state, part way through a transition, may be maintained indefinitely if required.

Whilst it will often be preferable to apply the transformation to the output of both cameras, the invention encompasses applying the transformation to only one camera output.

The invention is, of course, equally applicable to transitions between cameras that view the scene from similar directions of view and it thus provides a useful addition to the production techniques for video programming.

This invention has been described by way of example only and a wide variety of further modifications are possible without departing form the scope of the invention as defined by the appended claims.

The invention claimed is:

1. A method of making an output sequence of images representing a transition between two input images or image sequences where the two input images or sequences of images include views of a common scene from different viewpoints, comprising the steps of creating transformed images or image sequences having an apparent point of view that moves along on a path joining the viewpoints of the two input images or sequences of images, wherein geometric transforms that vary over the said output sequence are applied to at least some input images or sequences of images so as to create said respective transformed images or image sequences and including the transformed images or sequences of images in the said output sequence of images.

2. A method according to claim 1 in which the said geometric transforms smoothly interpolate the apparent fields of view of the transformed images between the respective input image or image sequence fields of view.

3. A method according to claim 1 in which the said geometric transform is a perspective transform that dynamically transforms the shape of a notional laminar object lying in a plane in the said common scene so that it maintains the shape it would appear to have from the said apparent point of view.

4. A method according to claim 3 in which the said notional laminar object is aligned in the two transformed images or image sequences.

5. A method according to claim 3 in which the said transform dynamically transforms the shapes of a plurality of notional laminar objects lying in respective planes in the said common scene so that the said notional laminar objects maintain the respective shapes they would appear to have from the said apparent point of view.

6. A method according to claim 1 which the field of view of a transformed image is augmented by including picture information from a stored reference image.

7. A method according to claim 6 in which the field of view of a transformed image is augmented by including picture information from a stored reference image only in those parts of the transformed image that were not included in the said transformed image prior to its transformation.

8. A method according to claim 6 in which the said stored reference image is transformed to the same viewpoint and field of view as the said transformed image.

9. A method according to claim 6 in which the said stored reference image is created by transforming image data from a plurality of cameras to a common position and field of view and combining the said transformed image data in a reference-image store.

10. A method according to claim 1 in which the height of the said path is chosen so that the height smoothly varies between the respective heights of the input image or image sequence viewpoints.

11. A method according to claim 3 in which the said path is chosen so that the distance between: points on the said path and respective points on the said plane corresponding to the centres of the transformed images having an apparent point of view from that point on the path smoothly varies between the respective distances corresponding to the two ends of the said path.

12. A method according to claim 1 in which the said path is chosen so that the horizontal angle of the line joining the said apparent point of view to a point in the scene corresponding to a chosen position in the transformed image smoothly varies between the respective angles corresponding to the ends of the said path.

13. A method according to claim 1 in which the said path is derived automatically from data associated with the said input images or image sequences.

14. A method according to claim 1 in which the said geometric transform varies a magnification of a transformed image in dependence on the distance between the said apparent point of view and a point in the scene corresponding to a chosen position in the said transformed image.

15. A method according to claim 1 in which the said output sequence is formed by cross fading between the respective said transformed images or image sequences.

16. A method according to claim 1 in which the said output sequence is formed by non additively mixing between the respective said transformed images or image sequences.

17. A method according to claim 1 in which the said output sequence is formed by wiping between the respective said transformed images or image sequences.

18. A method according to claim 1 in which the said output sequence is formed by making a cut between the respective said transformed images or image sequences at a point on the said path.

19. A method according to claim 1 in which at least one of the said input image sequences comprises the forward or backward replay of a recording at a speed different from that at which it was recorded.

20. Apparatus for use in making an output sequence of images representing a transition between two input images or image sequences, comprising a mixer for receiving two input images or sequences of images from respective cameras viewing a common scene from different viewpoints, a path interpolator receiving camera calibration information and at least one digital video effects unit receiving images from a camera and path information from the path interpolator, wherein geometric transforms that vary over the said output sequence are applied to at least some input images or sequences of images so as to create respective transformed images or image sequences having an apparent point of view that moves along on a path joining the viewpoints of the two input images or sequences of images and the transformed images or sequences of images are included in the output sequence of images from the mixer.

21. Apparatus according to claim 20 in which the said geometric transforms smoothly interpolate the apparent fields of view of the transformed images between the respective input image or image sequence fields of view.

22. Apparatus according to claim 20 in which the said geometric transform is a perspective transform that dynamically transforms the shape of a notional laminar object lying in a plane in the said common scene so that it maintains the shape it would appear to have from the said apparent point of view.

23. Apparatus according to claim 20 in which the said notional laminar object is aligned in the two transformed images or image sequences.

24. Apparatus according to claim 20 in which the said transform dynamically transforms the shapes of a plurality of notional laminar objects lying in respective planes in the said common scene so that the said notional laminar objects maintain the respective shapes they would appear to have from the said apparent point of view.

25. Apparatus according to claim 20 in which the field of view of a transformed image is augmented by including picture information from a stored reference image in those parts of the transformed image that were not included in the said transformed image prior to its transformation.

26. Apparatus according to claim 25 in which the said stored reference image is transformed to the same viewpoint and field of view as the said transformed image.

27. Apparatus according to claim 25 in which the said stored reference image is created by transforming image data from a plurality of cameras to a common position and field of view and combining the said transformed image data in a reference-image store.

28. Apparatus according to claim 20 in which the height of the said path is chosen so that the height smoothly varies between the respective heights of the input image or image sequence viewpoints.

29. Apparatus according to claim 20 in which the said path is chosen so that the distance between: points on the said path and respective points on the said plane corresponding to the centres of the transformed images having an apparent point of view from that point on the path smoothly varies between the respective distances corresponding to the two ends of the said path.

30. Apparatus according to claim 20 in which the said path is chosen so that the horizontal angle of the line joining the said apparent point of view to a point in the scene corresponding to a chosen position in the transformed image smoothly varies between the respective angles corresponding to the ends of the said path.

31. Apparatus according to claim 20 in which the said path is derived automatically from data associated with the said input images or image sequences.

32. Apparatus according to claim 20 in which the said geometric transform varies the magnification of a transformed image in dependence on the distance between the said apparent point of view and a point in the scene corresponding to a chosen position in the said transformed image.

33. Apparatus according to claim 20 in which the said output sequence is formed by cross fading between the respective said transformed images or image sequences.

34. Apparatus according to claim 20 in which the said output sequence is formed by non additively mixing between the respective said transformed images or image sequences.

35. Apparatus according to claim 20 in which the said output sequence is formed by wiping between the respective said transformed images or image sequences.

36. Apparatus according to claim 20 in which the said output sequence is formed by making a cut between the respective said transformed images or image sequences at a point on the said path.

37. Apparatus according to claim 20 in which at least one of the said input image sequences comprises the forward or backward replay of a recording at a speed different from that at which it was recorded.

38. A non-transitory computer program product containing instructions adapted to cause programmable apparatus to implement a method of making an output sequence of images representing a transition between two input images or image sequences where the two input images or sequences of images include views of a common scene from different viewpoints, comprising the steps of creating transformed images or image sequences having an apparent point of view that moves along on a path joining the viewpoints of the two input images or sequences of images, wherein geometric transforms that vary over the said output sequence are applied to at least some input images or sequences of images so as to create said respective transformed images or image sequences and including the transformed images or sequences of images in the said output sequence of images.

* * * * *

UNITED STATES PATENT AND TRADEMARK OFFICE
CERTIFICATE OF CORRECTION

PATENT NO. : 8,515,205 B2  
APPLICATION NO. : 13/055509  
DATED : August 20, 2013  
INVENTOR(S) : Weston et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Fifteenth Day of September, 2015

Michelle K. Lee  
*Director of the United States Patent and Trademark Office*